(12) United States Patent
Schroeder et al.

(10) Patent No.: US 6,883,633 B2
(45) Date of Patent: Apr. 26, 2005

(54) DUAL PEDAL FOOT CONTROL FOR HYDROSTATIC DRIVE

(75) Inventors: James C. Schroeder, Ramsey, MN (US); Bradley K. Voigt, Maple Lake, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 107 days.

(21) Appl. No.: 10/360,756

(22) Filed: Oct. 19, 2001

(65) Prior Publication Data

US 2003/0188911 A1 Oct. 9, 2003

(51) Int. Cl.[7] .............................................. B60K 26/00
(52) U.S. Cl. ...................... 180/336; 180/315; 74/512
(58) Field of Search ................................ 180/307, 308, 180/335, 336, 315; 74/512

(56) References Cited

U.S. PATENT DOCUMENTS

| 3,448,634 | A | * | 6/1969 | Eggers et al. ................. 74/560 |
| 3,654,760 | A | * | 4/1972 | Bennett ........................ 60/452 |
| 3,691,863 | A | * | 9/1972 | Shaffer ......................... 74/478 |
| 3,995,510 | A | * | 12/1976 | Yost ........................... 74/478.5 |
| 4,109,546 | A | * | 8/1978 | Povejsil ..................... 74/473.16 |
| 4,255,984 | A | * | 3/1981 | Abels et al. .............. 74/473.16 |
| 4,299,137 | A | * | 11/1981 | Malecha ....................... 74/512 |
| 4,750,319 | A | * | 6/1988 | Aldred ............................ 56/7 |
| 5,048,638 | A | * | 9/1991 | Duncan et al. ............. 180/307 |
| 5,216,935 | A | * | 6/1993 | Shimamura et al. .......... 74/512 |
| 5,842,378 | A | * | 12/1998 | Zellmer .................... 74/473.17 |
| 6,138,802 | A | * | 10/2000 | McFarlane et al. ........ 192/13 R |

FOREIGN PATENT DOCUMENTS

DE    2 210 035    *    9/1973

* cited by examiner

*Primary Examiner*—Ruth Ilan
(74) *Attorney, Agent, or Firm*—Douglas B. Farrow

(57) ABSTRACT

In a propulsion unit having a hydrostatic drive, a pair of pedals are clamped to the axle in such a manner as to be comfortably positioned for the feet of the operator. The angular position of each pedal relative to the axle may be adjusted such that the two pedals may have different angular orientations if desired. One pedal may be comfortably positioned for directing forward motion of the vehicle while the other may be more comfortable for reverse motion.

1 Claim, 1 Drawing Sheet

DUAL PEDAL FOOT CONTROL FOR HYDROSTATIC DRIVE

BACKGROUND OF THE INVENTION

Figure 1:
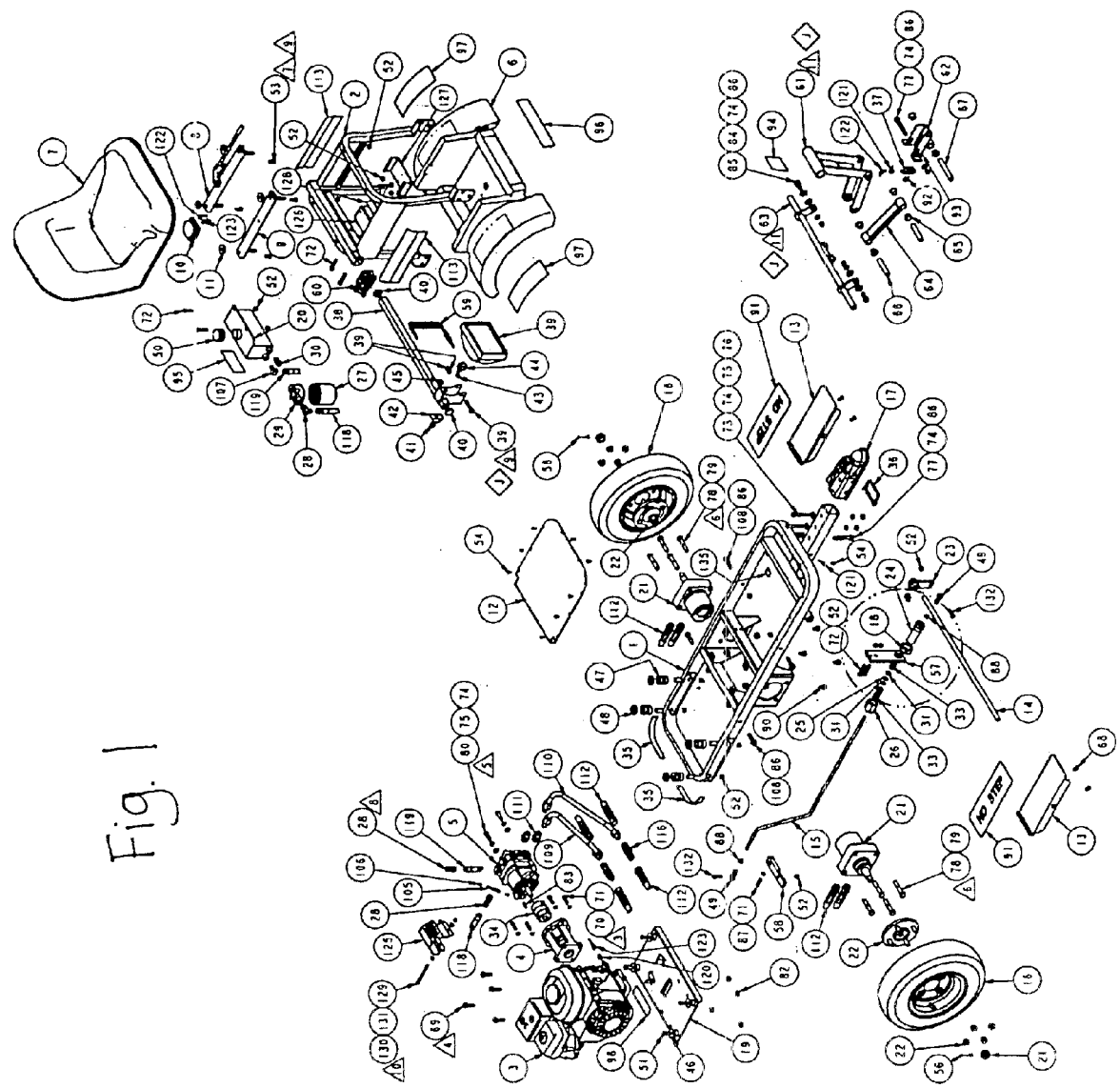

Lawn tractors and similar vehicles have used hydrostatic drives for many years. Often, the drives are actuated by a rocker pedal with heel and toe action such that depressing the toe portion of the pedal produces forward motion of the vehicle and pressing the hell of the pedal produces rearward or reverse motion.

SUMMARY OF THE INVENTION

It is an object of this invention to provide a control mechanism for such hydrostatic drives which is more flexible for the operator and which allows maximum efficiency during operation, particularly where rapid changes of direction are required such as when used on a vehicle propelling a linestriper. The propulsion unit is designed for attachment via a ball hitch to the rear of a walk-behind linestriper.

The actuating lever for the hydrostatic drive typically provides drive in one direction when the lever is rotated one way and in the other direction when lever rotation is reversed. In the instant invention, a rod is attached to the actuating lever. An axle is rotatable relative to the frame of the vehicle and is generally perpendicular to the longitudinal axis of the vehicle.

A pair of pedals are clamped to the axle in such a manner as to be comfortably positioned for the feet of the operator. The angular position of each pedal relative to the axle may be adjusted such that the two pedals may have different angular orientations if desired. One pedal may be comfortably positioned for directing forward motion of the vehicle while the other may be more comfortable for reverse motion.

Such an arrangement divides the fatigue normally experienced by one foot between both feet. One foot can rest while the other controls motion.

These and other objects and advantages of the invention will appear more fully from the following description made in conjunction with the accompanying drawings wherein like reference characters refer to the same or similar parts throughout the several views.

A BRIEF DESCRIPTION OF THE DRAWINGS

FIG. 1 is an exploded view of the instant invention.

DESCRIPTION OF THE PREFERRED EMBODIMENT

The instant invention is shown in FIG. 1. A frame 1 has an axle 14 rotatably mounted perpendicular to the longitudinal axis of frame 1. A pair of pedals 13 are located on either side of frame 1 and are releasably clamped to axle 14 by set screws 68. In turn, a lever arm 23 attached to axle 14 is connected to actuating rod 15 which in turn operates hydrostatic drive 5 (which is in turn plumbed in parallel to drive motors 21).

It is contemplated that various changes and modifications may be made to the foot control assembly without departing from the spirit and scope of the invention as defined by the following claims.

What is claimed is:

1. In a propulsion unit having a hydrostatic drive on a frame having a longitudinal axis and an actuating rod operating said drive, the improvement comprising a pair of pedals independently clamped to an axle in such a manner as to be positioned for the feet of the operator, said actuating rod being attached to said axle, each said pedal having first and second ends, said first and second ends being located on opposites sides of and extending from said axle so as to allow either pedal to be operated by the operator's heel and/or toe in order to operate said hydrostatic drive.

* * * * *